Dec. 31, 1957 H. WOLFSON 2,818,537

GERMANIUM DIODES

Filed Oct. 12, 1953

Inventor
H. WOLFSON
By Philip M. Bolton
Attorney

United States Patent Office 2,818,537

Patented Dec. 31, 1957

2,818,537

GERMANIUM DIODES

Henry Wolfson, London, England, assignor to International Standard Electric Corporation, New York, N. Y., a corporation of Delaware Application October 12, 1953, Serial No. 385,630

Claims priority, application Great Britain October 15, 1952

2 Claims. (Cl. 317—236)

The present invention relates to electric crystal rectifiers or diodes.

The rectifiers with which the invention is concerned are of the kind comprising a germanium crystal having a base electrode making low resistance contact with the surface of the crystal, and a sharply pointed wire electrode or cat whisker making contact with some part of the crystal surface not covered by the base electrode.

The principal object of the invention is to improve the rectification ratio of such crystal diodes or rectifiers by reducing the forward resistance without appreciably reducing the reverse resistance.

This object is achieved according to this invention by providing a method of manufacturing an electric rectifier consisting of a crystal of germanium having a cat whisker in contact with its surface, which includes the step of producing beneath the whisker point a surface contact film consisting of an alloy of lead or tin with the germanium, by means of an electroforming process in which an electric current is passed through the cat whisker and crystal.

The invention also provides an electric crystal rectifier made in accordance with this method.

The invention further provides an electric crystal rectifier comprising a crystal of germanium having a base electrode making low resistance contact with part of the surface of the crystal, a thin contact film consisting of an alloy of germanium with lead or tin covering another part of the said surface, and a cat whisker electrode making contact with the said film.

The invention will be described with reference to the accompanying drawing, in which.

In the manufacture of point contact germanium diodes, we found that as the purity (and therefore the specific resistivity) of the germanium increases, while the peak back voltage and reverse resistance increase, the forward resistance (required to be as low as possible) also increases. The rectification ratio of reverse resistance to forward resistance should be as high as possible and can obviously be improved by decreasing the forward resistance.

For several reasons we also desire to use as point contact material tungsten cat whiskers. We have found that the use of platinum contacts, while under certain conditions yielding higher forward currents, invariably has a detrimental lowering effect on reverse resistance.

It is the usual practice to subject a germanium rectifier to an electroforming process in order to improve its characteristics. In this process electrical forming pulses of current are passed through the rectifying contact. An account of this process can be found in the textbook entitled "Crystal Rectifiers" by H. C. Forrey and C. A. Whitmer, published by the McGraw-Hill Book Company, Inc., 1948, pages 370 and 371.

It is known that impurities may be injected into the germanium crystal from the cat whisker during the electroforming process to effect certain conductivity changes; for example, to obtain P- or N-type conductivity, impurities chosen respectively from group III and group V of the periodic table are commonly used. These are usually known as "significant impurities."

We have investigated the effect of injecting, during the usual electroforming process, elements from group IV of the periodic table, i. e. the group to which germanium belongs. It would seem that as far as reverse characteristics are concerned such elements would be "non-significant," but that they may be expected to affect the forward conductance of the rectifier.

Figure 1:
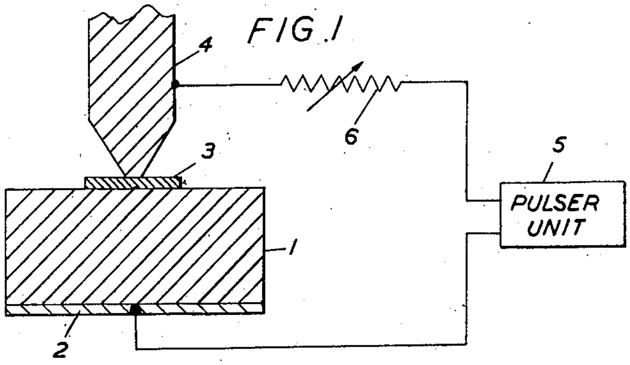
Fig. 1 shows a diagram illustrating the method of manufacture of a crystal rectifier according to the invention.

As a result of this work we have found that we are able to improve the forward conductance (lower the forward resistance) by a factor of up to 5 times in the manner illustrated in Fig. 1, which shows a sectional view of a germanium rectifier and the connections to an electroforming circuit.

The desired results are achieved more successfully, the higher the specific resistivity (the greater the purity) of the germanium.

Referring to Fig. 1, a germanium crystal slice 1 is provided in some suitable way with a base electrode 2 making low resistance contact with the lower surface of the slice. To the upper surface of the slice 1 is applied a thin layer 3 of lead oxide of high purity, free from elements from group III or group V of the periodic table. The oxide $Pb_3O_4$ (also known as red lead or minium) is the preferred oxide to use. If desired, the layer may be bonded to the surface of the crystal with a trace of an organic binder such as nitrocellulose, the amount of the binder not being sufficient to make the layer non-conducting.

A cat whisker 4, preferably of tungsten, is brought into contact with the layer 3, and electrical forming pulses are applied in the usual way, for example by means of a circuit consisting of a pulser unit 5 providing pulses such as those described at the top of page 371 of the textbook already referred to, and an adjustable resistor 6, between the base electrode 2 and the cat whisker 4, as indicated in Fig. 1.

The resistor 6 should be adjusted so that the current pulses produced are able to generate sufficient heat at the cat whisker point to decompose the lead oxide layer 3 and to alloy the lead set free with the germanium at the surface. The rectifier then appears as shown in section in Fig. 2, in which a low resistance contact film 7 has been formed below the point of the cat whisker 4. This film consists of a thin layer of germanium-lead alloy. The reduction in the forward resistance of the rectifier is believed to result principally from the effective increase in the contact area of the cat whisker 4, but the reverse resistance, which is produced mainly by the P-N junction or barrier which exists below the surface of the crystal, is not thereby appreciably affected, and so the rectification ratio is increased.

It may be added that we believe that the oxygen set free by the decomposition of the lead oxide prevents a deterioration of the reverse resistance characteristic of the rectifier by the heat necessary for decomposition.

Figure 2:
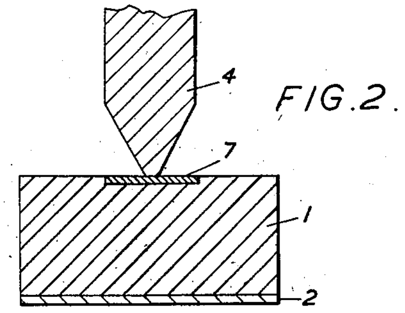
Fig. 2 illustrates the rectifier after the process according to the invention has been applied.
Figure 3:
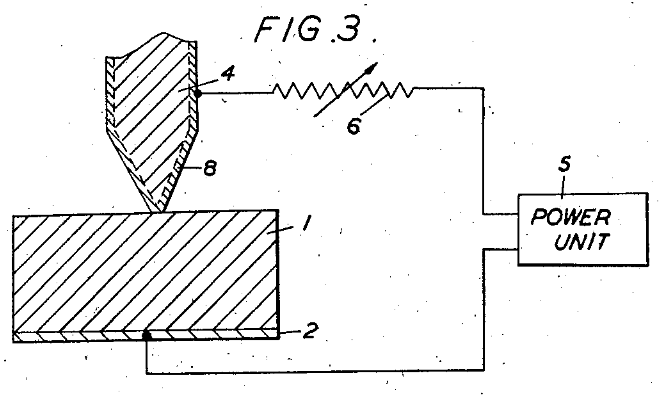
Fig. 3 shows a modification of Fig. 1.

An alternative method of carrying out the invention is illustrated in Fig. 3. In this case no layer of lead oxide is provided, but instead, the cat whisker 4 is provided at the pointed end with a plated coating 8 of pure lead, produced for example, by electrode deposition using a sulphamate electrolyte. On applying the electroforming pulses as in Fig. 1, some of the lead is transferred to, and alloyed with, the surface of the germanium, and a result similar to Fig. 2 is obtained. It is essential that the lead coating 8 should be free from significant impurities unless it is desired at the same time to bring about changes in the reverse characteristic of the rectifier.

By the method of Fig. 3, the same desirable increase in forward current results, but it has been found that more skill is necessary in carrying out the electroforming process if the reverse resistance is not to be reduced.

It may be added that tin oxide may be used instead of lead oxide for the layer 3 of Fig. 1, and in that case the contact film 7 of Fig. 2 will consist of an alloy of germanium and tin. However, a smaller improvement in rectification ratio is to be expected, and so lead oxide is preferred. Likewise, in Fig. 3, the cat whisker 4 may be plated with tin instead of lead.

The improvement in rectification ratio obtained by the method according to the invention depends on the specific resistivity of the germanium employed. Thus for example, using germanium of low specific resistivity, for example 2 or 3 ohm/cm., the forward current for a conventional rectifier using a tungsten cat whisker may be of the order of 5 milliamps. at 1 volt. When according to the invention a germanium-lead alloy contact film is formed, the forward current will increase to between 7 and 10 milliamps., for example, without appreciably affecting the reverse current. If, for example, the specific resistivity of the germanium is in the range 10 to 20 ohm/cm., then the forward current which in a conventional rectifier may be 2 to 4 milliamps., is increased to from 7 to 20 milliamps. These results may be expected whether the method of Fig. 1 or Fig. 3 is used. However, if tin is used instead of lead, a forward current of about 2 to 4 milliamps. is increased to from 4 to 10 milliamps., which is less than the increase when lead is used.

While the principles of the invention have been described above in connection with specific embodiments, and particular modifications thereof, it is to be clearly understood that this description is made only by way of example and not as a limitation on the scope of the invention.

What I claim is:

1. An electric crystal rectifier comprising a semiconductor body with contacts applied to opposite surfaces thereof, comprising a thin contact film of an alloy of said semiconductor with a metal chosen from the group consisting of lead and tin covering a part of one of said surfaces and a cat whisker electrode in contact with said film.

2. An electric crystal rectifier comprising a crystal of germanium having a base electrode making low resistance contact with part of the surface of the crystal, a thin contact film of an alloy of germanium with one metal of the group consisting of lead and tin covering another part of the said surface, and a cat whisker electrode making contact with the said film.

References Cited in the file of this patent

UNITED STATES PATENTS

| | | |
|---|---|---|
| 2,438,110 | Brattain | Mar. 23, 1948 |
| 2,504,628 | Benzer | Apr. 18, 1950 |
| 2,514,879 | Lark-Horovitz et al. | July 11, 1950 |
| 2,530,110 | Woodyard | Nov. 14, 1950 |
| 2,623,102 | Shockley | Dec. 23, 1952 |
| 2,671,156 | Douglas et al. | Mar. 2, 1954 |